United States Patent
Irci et al.

(10) Patent No.: US 11,594,815 B2
(45) Date of Patent: Feb. 28, 2023

(54) WIRELESS DEVICES HAVING ANTENNA ISOLATION STRUCTURES

(71) Applicant: Apple Inc., Cupertino, CA (US)

(72) Inventors: Erdinc Irci, Sunnyvale, CA (US); Enrique Ayala Vazquez, Watsonville, CA (US); Hongfei Hu, Cupertino, CA (US); Ming Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 17/032,823

(22) Filed: Sep. 25, 2020

(65) Prior Publication Data

US 2022/0102852 A1 Mar. 31, 2022

(51) Int. Cl.

| H01Q 1/24 | (2006.01) |
|---|---|
| H01Q 1/52 | (2006.01) |
| H01Q 13/10 | (2006.01) |
| H01Q 5/25 | (2015.01) |
| H01Q 5/35 | (2015.01) |
| H01Q 9/04 | (2006.01) |
| H04M 1/02 | (2006.01) |

(52) U.S. Cl.
CPC .............. *H01Q 1/521* (2013.01); *H01Q 1/243* (2013.01); *H01Q 5/25* (2015.01); *H01Q 5/35* (2015.01); *H01Q 9/0421* (2013.01); *H01Q 13/103* (2013.01); *H04M 1/026* (2013.01)

(58) Field of Classification Search
CPC .......... H01Q 1/521; H01Q 1/243; H01Q 5/25; H01Q 5/35; H01Q 9/0421; H01Q 13/103; H04M 1/026

See application file for complete search history.

(56) References Cited

U.S. PATENT DOCUMENTS

| 9,368,869 B2 | 6/2016 | Chen et al. |
|---|---|---|
| 9,531,071 B2 | 12/2016 | Guterman et al. |
| 10,033,109 B1* | 7/2018 | Gummalla ............. H01Q 3/247 |
| 10,707,558 B2 | 7/2020 | Hu et al. |
| 2003/0201943 A1 | 10/2003 | Kadambi et al. |
| 2017/0346164 A1 | 11/2017 | Kim et al. |
| 2019/0081386 A1* | 3/2019 | Edwards ................ H01Q 5/328 |
| 2021/0066786 A1* | 3/2021 | Yarga ..................... H01Q 1/243 |
| 2021/0066799 A1* | 3/2021 | Avser ....................... H01Q 5/25 |
| 2021/0075090 A1* | 3/2021 | Yarga ..................... H01Q 1/241 |
| 2022/0085488 A1* | 3/2022 | Irci ......................... H01Q 1/243 |

* cited by examiner

*Primary Examiner* — Hai V Tran
*Assistant Examiner* — Michael M Bouizza
(74) *Attorney, Agent, or Firm* — Treyz Law Group, P.C.; Tianyi He

(57) ABSTRACT

An electronic device may be provided with wireless circuitry and a housing with upper and lower ends. The upper end may include first and second inverted-F antennas formed from portions of conductive peripheral housing structures separated from an antenna ground by a slot. The upper end may include an open slot antenna formed from a portion of the slot. The upper end may include an additional inverted-F antenna that overlap the slot. A parasitic element may be disposed between the open slot antenna and the additional inverted-F antenna and coupled to the antenna ground at a proximal end. A tuning component may be coupled between the parasitic element and the antenna ground.

20 Claims, 10 Drawing Sheets

WIRELESS DEVICES HAVING ANTENNA ISOLATION STRUCTURES

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. In particular, care must be taken to ensure that antennas in close proximity with each other are able to exhibit satisfactory performance over their corresponding ranges of operating frequencies while minimizing interference from each other.

It would therefore be desirable to be able to provide improved wireless communications circuitry for wireless electronic devices.

SUMMARY

An electronic device may be provided with wireless circuitry and a housing having peripheral conductive housing structures and a conductive support plate. The peripheral conductive housing structures may include first and second segments at an upper end of the device. The first and second segments may be separated from the conductive support plate by a slot. The wireless circuitry may include multiple antennas for covering different frequency bands.

As an example, the device may include a first inverted-F antenna formed from the first segment of the peripheral conductive housing structures and a second inverted-F antenna formed from the second segment of the peripheral conductive housing structures. The upper end of the device may include an additional inverted-F antenna having an antenna resonating element arm overlapping the upper slot. The upper end of the device may include an open slot antenna formed from an extension of the slot.

An unfed parasitic element may be disposed between the additional inverted-F antenna and the open slot antenna and overlap the upper slot. The parasitic element may be an L-shaped conductive structure having a first segment extending from an edge of the conductive support plate and a second segment extending between the additional inverted-F antenna and the open slot antenna. A tuning component may be coupled between the second segment and the edge of the conductive support plate. As examples, the tuning component may include one or more capacitors or one or more inductors.

DETAILED DESCRIPTION

Figure 1:
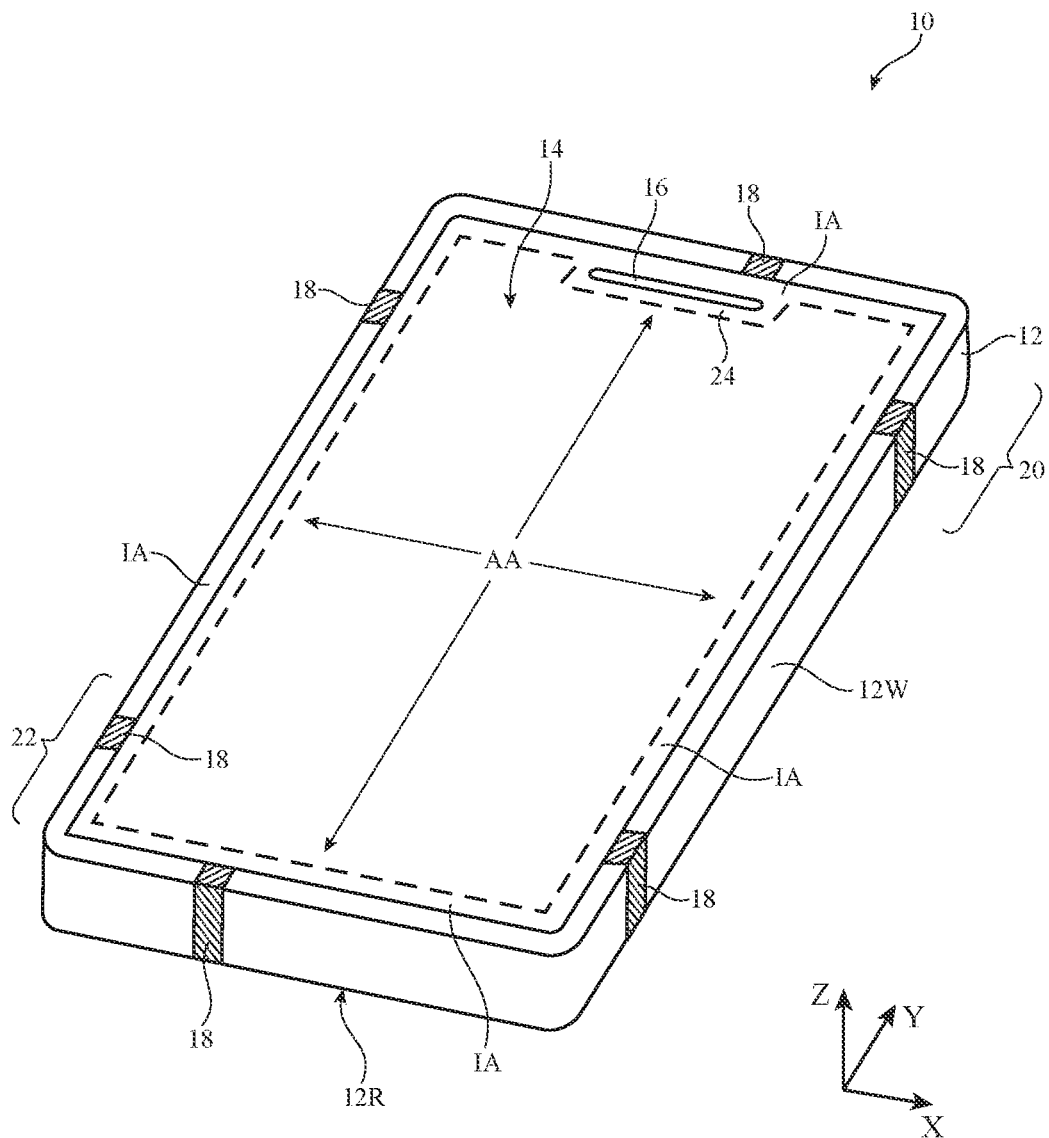
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
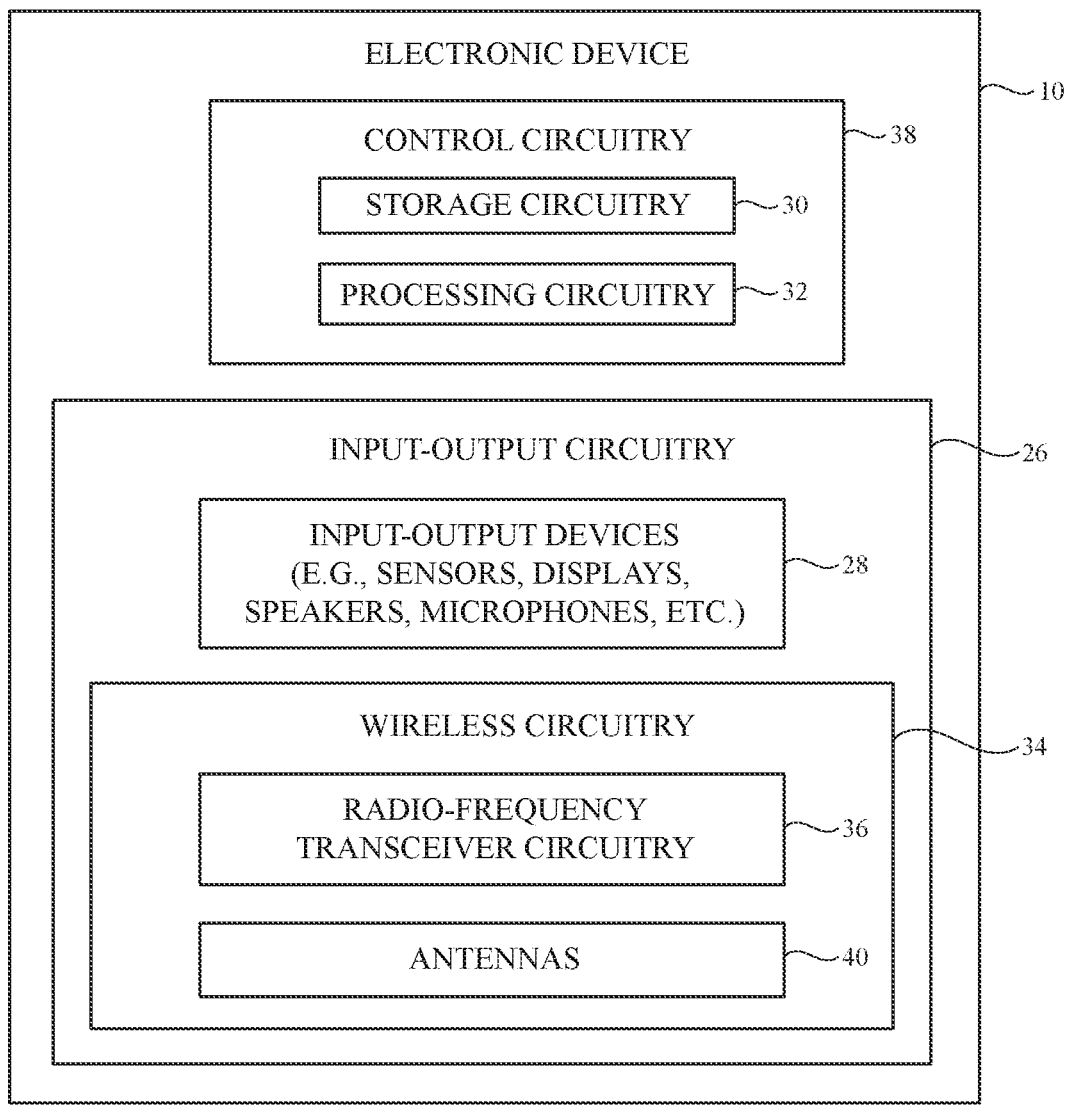
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols-sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals in various radio-frequency communications bands. For example, radio-frequency transceiver circuitry 36 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, 5G New Radio Frequency Range 2 (FR2) bands at millimeter and centimeter wavelengths between 20 and 60 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), an ultra-wideband (UWB) communications band supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by radio-frequency transceiver circuitry 36 may sometimes be referred to herein as frequency bands or simply as "bands," and may span corresponding ranges of frequencies.

In one suitable arrangement that is described herein as an example, the UHB band handled by radio-frequency transceiver circuitry 36 may include 4G bands between 3300 and 5000 MHz such as Long Term Evolution (LTE) bands B42 (e.g., 3400 MHz-3600 MHz), B46 (e.g., 5150-5925 MHz), and/or B48 (e.g., 3500-3700 MHz), as well as 5G bands below 6 GHz (e.g., 5G NR FR1 bands) such as 5G bands N77 (e.g., 3300-4200 MHz), N78 (e.g., 3300-3800 MHz), and/or N79 (e.g., 4400-5000 MHz). The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals). Different types of antennas may be used for different bands and combinations of bands.

Figure 3:
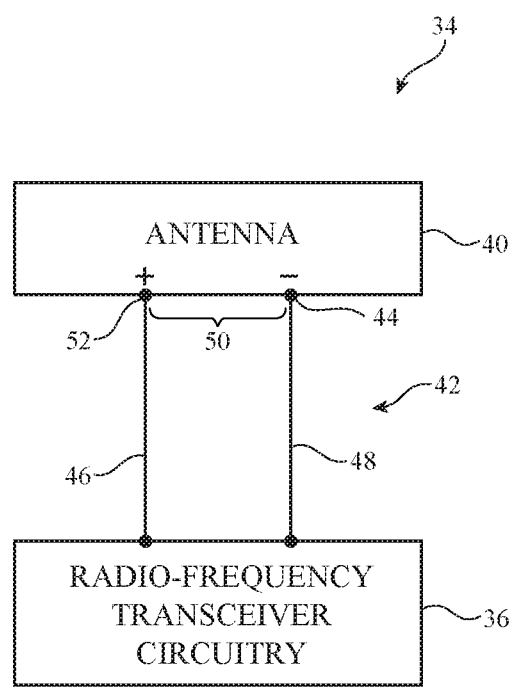
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include an antenna resonating element and an antenna ground. Antenna feed 50 may include a positive antenna feed terminal 52 coupled to the antenna resonating element and a ground antenna feed terminal 44 coupled to the antenna ground.

Radio-frequency transceiver circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
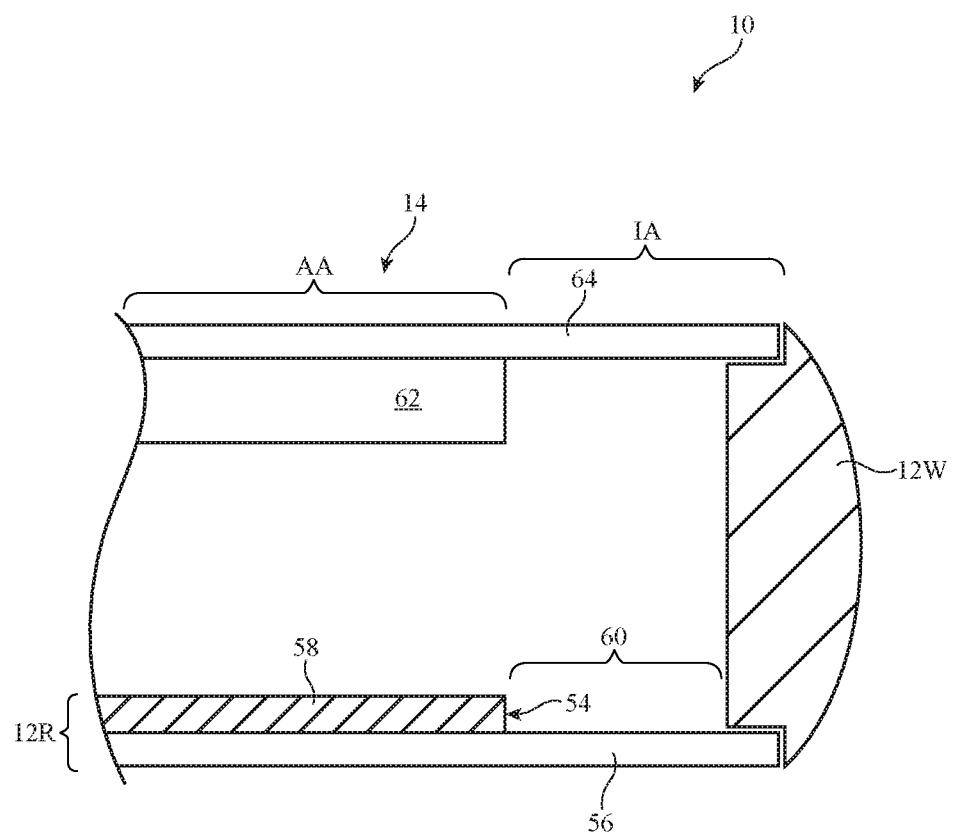
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive support plate 58 may, if desired, provide structural and mechanical support for device 10.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view.

In another suitable arrangement, dielectric cover layer 56 may be omitted and slot 60 may be filled with a solid dielectric material.

Conductive housing structures such as conductive support plate 58 and/or peripheral conductive housing structures 12W (e.g., the portion of peripheral conductive housing structures 12W opposite conductive support plate 58 at slot 60) may be used to form antenna structures for one or more of the antennas 40 in device 10. For example, conductive support plate 58 may be used to form the ground plane for one or more of the antennas 40 in device 10 and/or to form one or more edges of slot antenna resonating elements (e.g., slot antenna resonating elements formed from slot 60) for the antennas 40 in device 10. Peripheral conductive housing structures 12W may form an antenna resonating element arm (e.g., an inverted-F antenna resonating element arm) for one or more of the antennas 40 in device 10. If desired, a portion of peripheral conductive housing structures 12W and/or a portion of conductive support plate 58 (e.g., at edge 54 of slot 60) may form part of a conductive loop path used to form a loop antenna resonating element for antenna 40 that conveys radio-frequency signals in an NFC band.

Figure 5:
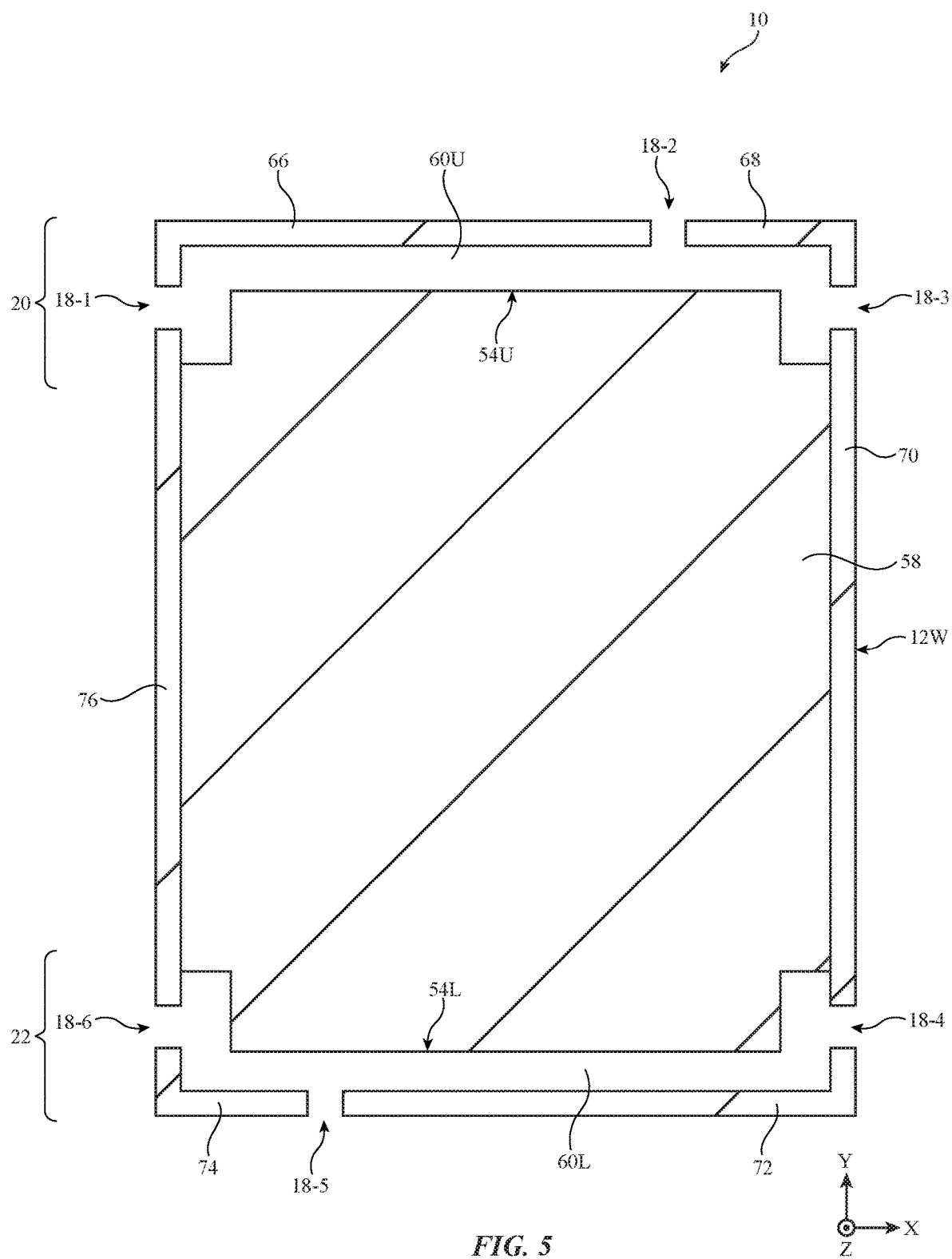
FIG. 5 is a top interior view of an illustrative electronic device having slots and segments of peripheral conductive housing structures that are used in forming multiple antennas for the electronic device in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top interior view showing how device 10 may include multiple slots 60 and may include multiple dielectric gaps that divide the peripheral conductive housing structures into segments. Display 14 has been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10, a third conductive sidewall at the right edge of device 10, and a fourth conductive sidewall at the bottom edge of device 10 (e.g., in an example where device 10 has a substantially rectangular lateral shape). Peripheral conductive housing structures 12W may be segmented by dielectric-filled gaps 18 such as a first gap 18-1, a second gap 18-2, a third gap 18-3, a fourth gap 18-4, a fifth gap 18-5, and a sixth gap 18-6. Gaps 18-1, 18-2, 18-3, 18-4, 18-5, and 18-6 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 76 of peripheral conductive housing structures 12W from segment 66 of peripheral conductive housing structures 12W. Gap 18-2 may divide the second conductive sidewall to separate segment 66 from segment 68 of peripheral conductive housing structures 12W. Gap 18-3 may divide the third conductive sidewall to separate segment 68 from segment 70 of peripheral conductive housing structures 12W. Gap 18-4 may divide the third conductive sidewall to separate segment 70 from segment 72 of peripheral conductive housing structures 12W. Gap 18-5 may divide the fourth conductive sidewall to separate segment 72 from segment 74 of peripheral conductive housing structures 12W. Gap 18-6 may divide the first conductive sidewall to separate segment 74 from segment 76.

In this example, segment 66 forms the top-left corner of device 10 (e.g., segment 66 may have a bend at the corner) and is formed from the first and second conductive sidewalls of peripheral conductive housing structures 12W (e.g., in upper region 20 of device 10). Segment 68 forms the top-right corner of device 10 (e.g., segment 68 may have a bend at the corner) and is formed from the second and third conductive sidewalls of peripheral conductive housing structures 12W (e.g., in upper region 20 of device 10). Segment 72 forms the bottom-right corner of device 10 and is formed from the third and fourth conductive sidewalls of peripheral conductive housing structures 12W (e.g., in lower region 22 of device 10). Segment 74 forms the bottom-left corner of device 10 and is formed from the fourth and first conductive sidewalls of peripheral conductive housing structures 12W (e.g., in lower region 22 of device 10).

Conductive support plate 58 may extend between opposing sidewalls of peripheral conductive housing structures 12W. For example, conductive support plate 58 may extend from segment 76 to segment 70 of peripheral conductive housing structures 12W (e.g., across the width of device 10, parallel to the X-axis). Conductive support plate 58 may be welded or otherwise affixed to segments 76 and 70. In another suitable arrangement, conductive support plate 58, segment 76, and segment 70 may be formed from a single, integral (continuous) piece of machined metal (e.g., in a unibody configuration).

As shown in FIG. 5, device 10 may include multiple slots 60 (FIG. 4) such as an upper slot 60U in upper region 20 and a lower slot 60L in lower region 22. The lower edge of upper slot 60U may be defined by upper edge 54U of conductive support plate 58 (e.g., an edge of conductive support plate 58 such as edge 54 of FIG. 4). The upper edge of upper slot 60U may be defined by segments 66 and 68 (e.g., upper slot 60U may be interposed between conductive support plate 58 and segments 66 and 68 of peripheral conductive housing structures 12W). The upper edge of lower slot 60L may be defined by lower edge 54L of conductive support plate 58 (e.g., an edge of conductive support plate 58 such as edge 54 of FIG. 4). The lower edge of lower slot 60L may be defined by segments 74 and 72 (e.g., lower slot 60L may be interposed between conductive support plate 58 and segments 74 and 72 of peripheral conductive housing structures 12W).

Upper slot 60U may have an elongated shape extending from a first end at gap 18-2 to an opposing second end at gap 18-3 (e.g., upper slot 60U may span the width of device 10). Similarly, lower slot 60L may have an elongated shape extending from a first end at gap 18-6 to an opposing second end at gap 18-4 (e.g., lower slot 60L may span the width of device 10). Slots 60U and 60L may be filled with air, plastic, glass, sapphire, epoxy, ceramic, or other dielectric material. Upper slot 60U may be continuous with gaps 18-1, 18-2, and 18-3 in peripheral conductive housing structures 12W if desired (e.g., a single piece of dielectric material may be used to fill both upper slot 60U and gaps 18-1, 18-2, and 18-3). Similarly, lower slot 60L may be continuous with gaps 18-6, 18-5, and 18-4 if desired (e.g., a single piece of dielectric material may be used to fill both lower slot 60L and gaps 18-6, 18-5, and 18-4).

Conductive support plate 58, segment 66, segment 68, and portions of upper slot 60U may be used in forming multiple antennas 40 in upper region 20 of device 10 (sometimes referred to herein as upper antennas). Conductive support plate 58, portions of lower slot 60L, segment 74, and segment 72 may be used in forming multiple antennas 40 in lower region 22 of device 10 (sometimes referred to herein as lower antennas). If desired, one or more phased antenna arrays for conveying millimeter and centimeter wave signals may at least partially overlap upper slot 60L, conductive support plate 60U, and/or lower slot 60L (not shown in FIG. 5 for the sake of clarity). The phased antenna arrays may radiate through display cover layer 64 of FIG. 4, through dielectric cover layer 56 of FIG. 4, and/or through one or more apertures in peripheral conductive housing structures 12W.

Figure 6:
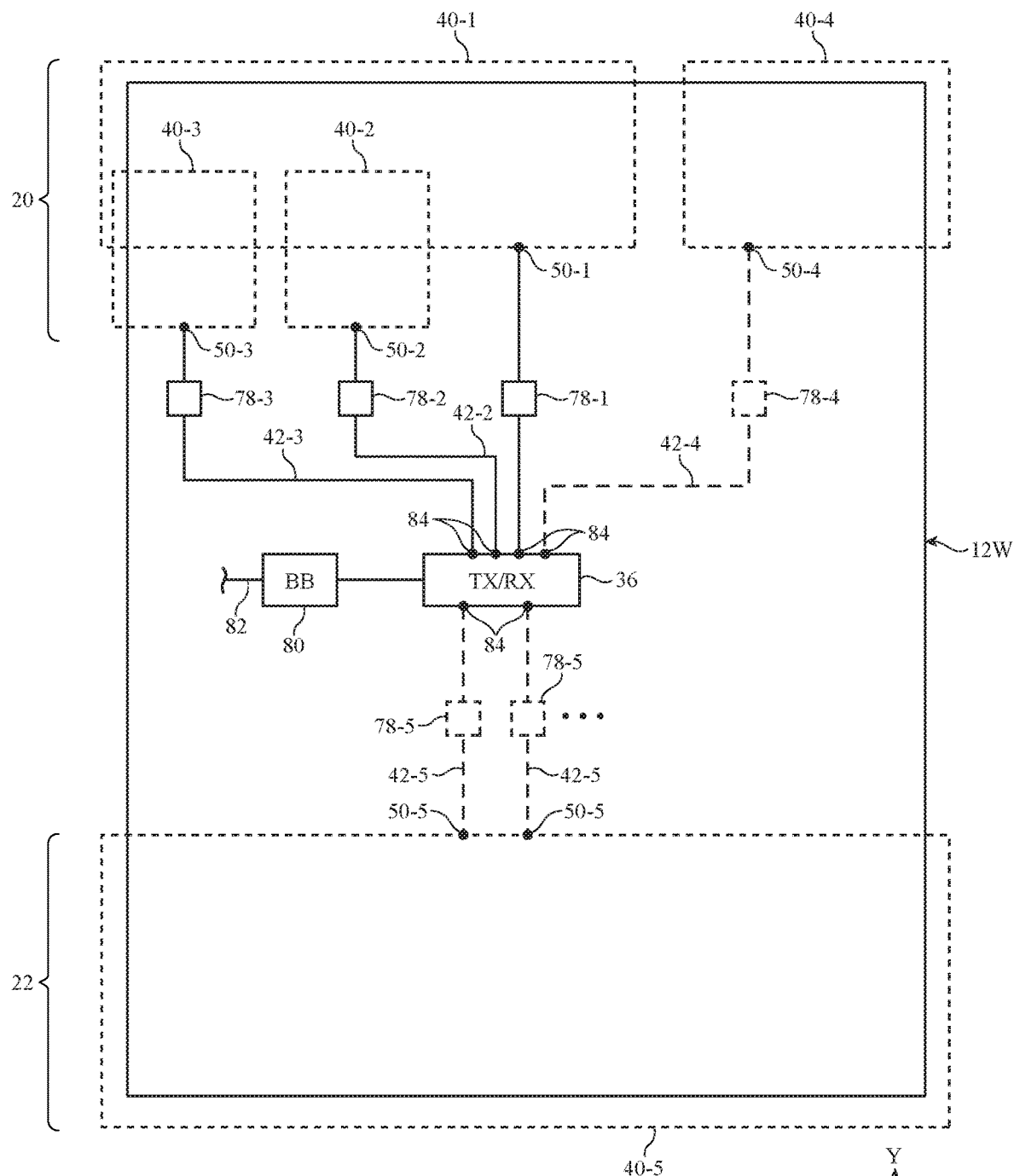
FIG. 6 is a diagram showing how an illustrative electronic device may include multiple antennas at different portions and ends of the electronic device accordance with some embodiments.

FIG. 6 is diagram showing how device 10 may include multiple antennas 40 in upper region 20 and lower region 22. As shown in FIG. 6, device 10 may include four antennas 40 in upper region 20 such as antennas 40-1, 40-2, 40-3, and 40-4. Device 10 may include one or more antennas 40-5 in lower region 22. In an illustrative example, device 10 may include five antennas 40-5 in lower region 22. Each antenna may include a corresponding antenna feed 50 (e.g., antenna 40-1 may have antenna feed 50-1, antenna 40-2 may have antenna feed 50-2, antenna 40-3 may have antenna feed 50-3, etc.). This example is merely illustrative and, in general, device 10 may include any desired number of antennas 40.

The volume of antenna 40-2 may at least partially overlap the volume of antenna 40-1 and/or antenna 40-3 if desired. The volume of antenna 40-3 may at least partially overlap the volume of antenna 40-1 and/or antenna 40-2 if desired. One or more antennas 40 in device 10 such as antennas 40-1, 40-3, 40-4, and one or more antennas 40-5 may be formed from portions of peripheral conductive housing structures 12W and conductive support plate 58 (FIG. 5).

As shown in FIG. 6, the wireless circuitry in device 10 may include one or more input-output ports such as port 82 for interfacing with digital data circuits in storage and processing circuitry (e.g., control circuitry 38 of FIG. 2). Wireless circuitry 34 may include baseband circuitry such as baseband (BB) processor 80 coupled between port 82 and radio-frequency transceiver (TX/RX) circuitry 36. Port 82 may receive digital data (e.g., uplink data) from the control circuitry that is to be transmitted by radio-frequency transceiver circuitry 36. Incoming data (e.g., downlink data) that has been received by radio-frequency transceiver circuitry 36 and baseband processor 80 may be supplied to the control circuitry via port 82.

Radio-frequency transceiver circuitry 36 may include multiple transceiver ports 84 that are each coupled to a respective transmission line path 42 (e.g., a first transmission line path 42-1, a second transmission line path 42-2, a third transmission line path 42-3, etc.). Transmission line path 42-1 may couple a first transceiver port 84 of radio-frequency transceiver circuitry 36 to the antenna feed 50-1 of antenna 40-1. Transmission line path 42-2 may couple a second transceiver port 84 to the antenna feed 50-2 of antenna 40-2. Similarly, transmission line paths 42-3, 42-4, and 42-5 may each couple a respective transceiver port 84 to antenna feed 50-3 of antenna 40-3, antenna feed 50-4 of antenna 40-4, and one or more antenna feeds 50-5 of one or more respective antennas 40-5, respectively.

Radio-frequency front end circuits 78 may be interposed on each transmission line path 42 (e.g., a first front end circuit 78-1 may be interposed on transmission line path 42-1, a second front end circuit 78-2 may be interposed on transmission line path 42-2, a third front end circuit 78-3 may be interposed on transmission line path 42-3, etc.). Front end circuits 78 may each include switching circuitry, filter circuitry (e.g., duplexer and/or diplexer circuitry, notch filter circuitry, low pass filter circuitry, high pass filter circuitry, bandpass filter circuitry, etc.), impedance matching circuitry for matching the impedance of transmission line path 42 to the corresponding antenna 40, networks of active and/or passive components such as antenna tuning components, radio-frequency coupler circuitry for gathering antenna impedance measurements, or any other desired radio-frequency circuitry. If desired, front end circuits 78 may include switching circuitry that is configured to selectively couple antennas 40-1 through 40-5 to different respective transceiver ports 84 (e.g., so that each antenna can handle communications for different transceiver ports 84 over time based on the state of the switching circuits in front end circuits 78). If desired, front end circuits 78 may include filtering circuitry (e.g., duplexers and/or diplexers) that allow the corresponding antenna to transmit and receive radio-frequency signals in one or more frequency bands at the same time (e.g., using a frequency domain duplexing (FDD) scheme). In general, any desired combination of antennas may transmit and/or receive radio-frequency signals at a given time.

Amplifier circuitry such as one or more power amplifiers may be interposed on transmission line paths 42 (e.g., within front end circuits 78 or elsewhere) and/or may be formed within radio-frequency transceiver circuitry 36 for amplifying radio-frequency signals output by radio-frequency transceiver circuitry 36 prior to transmission over antennas 40. Amplifier circuitry such as one or more low noise amplifiers may be interposed on transmission line paths 42 (e.g., within front end circuits 78 or elsewhere) and/or may be formed within radio-frequency transceiver circuitry 36 for amplifying radio-frequency signals received by antennas 40 prior to conveying the received signals to radio-frequency transceiver circuitry 36. In the example of FIG. 3, separate front end circuits 78 are interposed on each transmission line path 42. This is merely illustrative. If desired, two or more transmission line paths 42 may share the same front end circuit 78.

Radio-frequency transceiver circuitry 36 may, for example, include circuitry for converting baseband signals received from baseband processor 80 into corresponding radio-frequency signals. For example, radio-frequency transceiver circuitry 36 may include mixer circuitry for up-converting the baseband signals to radio-frequencies prior to transmission over antennas 40. Radio-frequency transceiver circuitry 36 may include digital to analog converter (DAC) and/or analog to digital converter (ADC) circuitry for converting signals between digital and analog domains. Radio-frequency transceiver circuitry 36 may include circuitry for converting radio-frequency signals received from antennas 40 over transmission line paths 42 into corresponding baseband signals. For example, radio-frequency transceiver circuitry 36 may include mixer circuitry for down-converting the radio-frequency signals to baseband frequencies prior to conveying the baseband signals to baseband processor 80. Baseband processor 80, front end circuits 78, and/or radio-frequency transceiver circuitry 36 may be formed on the same substrate, integrated circuit, integrated circuit package, or module, or two or more of these components may be formed on separate substrates, integrated circuits, integrated circuit packages, or modules.

If desired, each of the antennas 40-1 through 40-5 may handle radio-frequency communications in one or more frequency bands. In an illustrative arrangement, antennas 10 in device 10 such as antennas 40-1 through 40-5 may collectively cover the cellular low band (LB) (e.g., from 600 to 960 MHz), the L5 GPS band at 1176 MHz, the cellular low-midband (LMB) (e.g., from 1400 to 1550 MHz), the L1 GPS band at 1575 MHz, the cellular midband (MB) (e.g., from 1700 to 2200 MHz), the cellular high band (HB) (e.g., from 2300 to 2700 MHz), the 2.4 GHz WLAN and WPAN bands (e.g., from 2400 to 2480 MHz), the cellular ultra-high band (UHB) (e.g., from 3300 to 5000 MHz and including the 5G NR FR1 bands N77, N78, and/or N79), the 5 GHz WLAN band (e.g., from about 5180 to about 5825 MHz), and one or more UWB bands (e.g., bands from about 6250 to 8250 MHz such as a first UWB band at 6.5 GHz and a second UWB band at 8.0 GHz).

As illustrative examples, antenna 40-1 may cover the cellular low band, low-midband, midband, and high band, and the L1 GPS band, antenna 40-4 may cover the cellular midband highband, and ultra-high band, and the 2.4 GHz WLAN and WPAN bands, antenna 40-2 may cover the 5 GHz WLAN band, and antenna 40-3 may cover the cellular ultra-high band and the UWB band(s). If desired, portions of antennas 40-2 and 40-4 may also be used to form a loop antenna resonating element for an NFC antenna that covers an NFC band.

In order to increase the overall data throughput of wireless circuitry 34 (FIG. 2), multiple antennas may be operated using a multiple-input and multiple-output (MIMO) scheme. When operating using a MIMO scheme, two or more antennas on device 10 may be used to concurrently convey multiple independent streams of wireless data at the same frequencies. This may significantly increase the overall data throughput between device 10 and the external communications equipment relative to scenarios where only a single antenna is used. In general, the greater the number of antennas that are used for conveying wireless data under the MIMO scheme, the greater the overall throughput of wireless circuitry 34. If desired, carrier aggregation schemes may also be used in performing wireless operations with antennas 40-1 through 40-5.

These examples of frequency band coverage for antennas 40 in device 10 is merely illustrative. In general, device 10 may include any desired number of antennas for covering any desired number of frequency bands at any desired frequencies.

Figure 7:
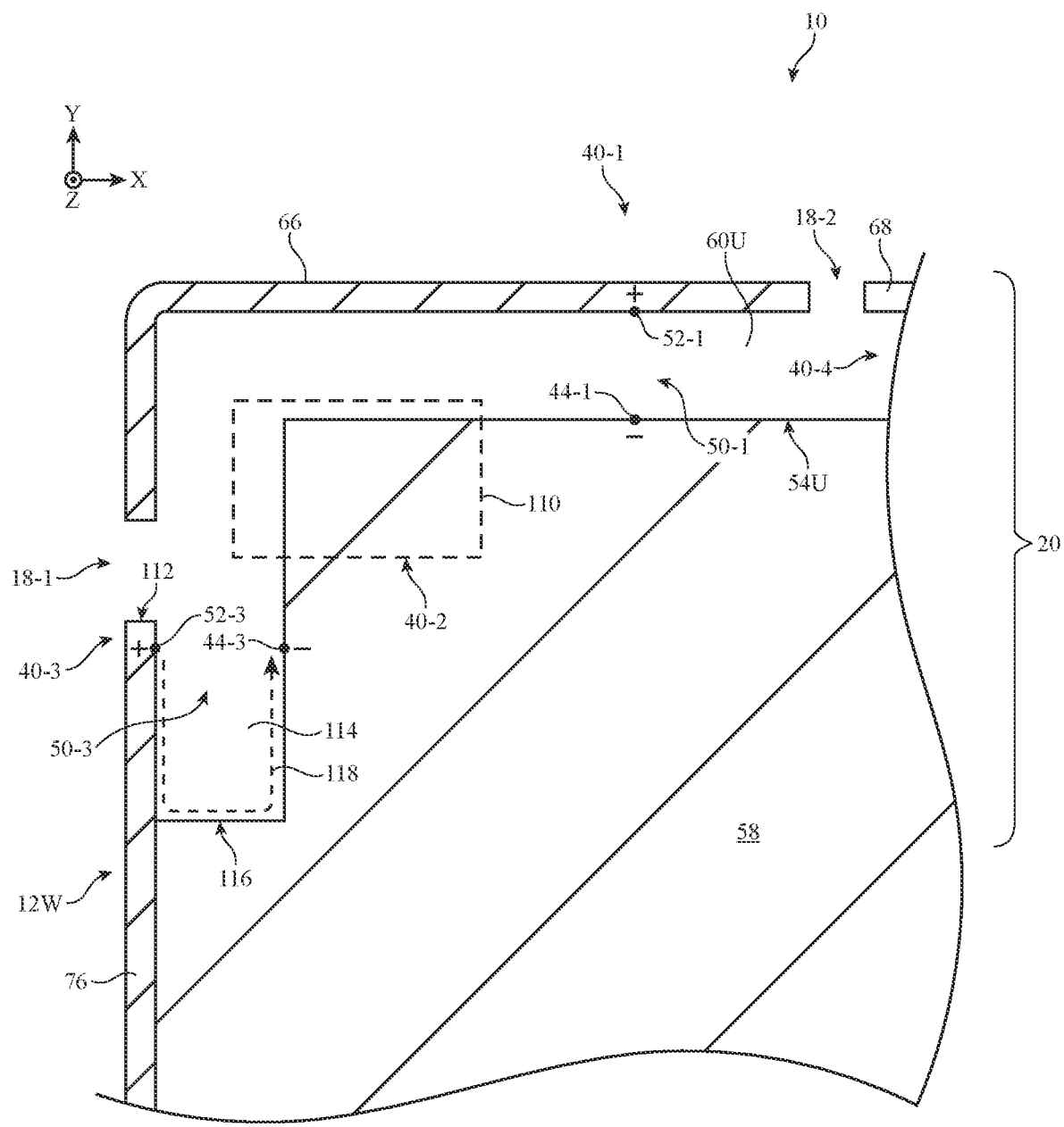
FIG. 7 is a top interior view of illustrative antennas located at a corner of an electronic device in accordance with some embodiments.

FIG. 7 is a top interior view of the antennas in the left corner of upper region 20 of device 10. As shown in FIG. 7, segment 76 and conductive support plate 58 may form part of the antenna ground for antennas 40-1, 40-2, and 40-3 in upper region 20 of device 10. Additional conductive components such as conductive housing structures, conductive structures from electronic components, printed circuit board traces, strips of conductor such as strips of wire or metal foil, conductive display components, and/or other conductive structures may also form part of the antenna ground.

Antenna 40-1 may have an antenna resonating element arm (e.g., an inverted-F antenna resonating element arm) formed from segment 66 of peripheral conductive housing structures 12W. Antenna 40-1 may be fed using antenna feed 50-1. Antenna feed 50-1 may be coupled across upper slot 60U. For example, antenna feed 50-1 may have a positive antenna feed terminal 52-1 coupled to segment 66 and may have a ground antenna feed terminal 44-1 coupled to conductive support plate 58. Antenna feed 50-1 and antenna 40-1 may convey radio-frequency signals in the cellular low band, the cellular low-midband, the L1 GPS band, the cellular midband, and the cellular high band. Corresponding antenna currents for antenna 40-1 (e.g., currents in the cellular low band, the cellular low-midband, the L1 GPS band, the cellular midband, and the cellular high band) may flow along segment 66 and conductive support plate 58 (e.g., at upper edge 54U). If desired, antenna 40-1 may include one or more return paths coupled between segment 66 and the antenna ground (not shown in FIG. 7 for the sake of clarity). The return paths may, if desired, include corresponding antenna tuning components for adjusting the frequency response of antenna 40-1 in one or more bands. The frequency response of antenna 40-1 may be determined by the length of the segment 66 (e.g., a first length or portion of segment 66 extending from antenna feed 50-1 to gap 18-1 and a second length or portion of segment 66 extending from antenna feed 50-1 to gap 18-2), one or more harmonic modes of these lengths of segment 66 and/or upper slot 60U, and/or antenna tuning components coupled across upper slot 60U, for example.

Antenna 40-3 may be an open slot antenna having an open slot antenna resonating element formed from extended portion 114 of upper slot 60U (e.g., an open slot antenna resonating element having edges defined by conductive support plate 58, segment 76, and/or other portions of the antenna ground and having an open end at gap 18-1). Extended portion 114 of upper slot 60U may extend between segment 76 and conductive support plate 58, in the −Y direction, from an end of upper slot 60U at gap 18-1. For example, extended portion 114 of upper slot 60U may have a closed end 116 that extends by a non-zero distance beyond end 112 of segment 76 (e.g., the end of segment 76 at gap 18-1).

Antenna 40-3 may be fed using antenna feed 50-3. Antenna feed 50-3 may be coupled across extended portion 114 of upper slot 60U. For example, antenna feed 50-3 may have a positive antenna feed terminal 52-3 coupled to segment 76 (e.g., at or adjacent end 112) and may have a ground antenna feed terminal 44-3 coupled to conductive support plate 58. Antenna feed 50-3 and antenna 40-3 may convey radio-frequency signals in the UWB band(s) and the cellular ultra-high band. Corresponding antenna currents for antenna 40-3 (e.g., currents in the cellular ultra-high band and the UWB band(s)) may flow around the perimeter of extended portion 114 of upper slot 60U, as shown by arrow 118. If desired, one or more antenna tuning components (e.g., components having fixed and/or adjustable inductors, capacitors, resistors, filters, and/or switches coupled together in any desired arrangement) may be coupled across extended portion 114 of upper slot 60U. The frequency response of antenna 40-3 may be determined by the length of the perimeter of extended portion 114 of upper slot 60U and/or by antenna tuning components coupled across extended portion 114 of upper slot 60U, for example. Because antenna 40-3 is formed at a corner of device 10 (e.g., overlapping inactive area IA of FIG. 1), antenna 40-3 may convey radio-frequency signals in the UWB band(s) across the hemisphere over the front face of device 10 in addition to covering the UWB band(s) across the hemisphere below the rear face of device 10. This may supplement wireless coverage in the UWB band(s) provided by other antennas (e.g., a doublet or triplet of antennas) that convey radio-frequency signals in the UWB band(s) through the rear face of device 10 (e.g., through dielectric cover layer 56 of FIG. 4), such that the antennas collectively provide UWB coverage across substantially all of a sphere surrounding device 10.

Antenna 40-2 may have an antenna resonating element formed from conductive traces on a printed circuit substrate (e.g., a flexible printed circuit, a rigid printed circuit board, etc.) or another substrate. Antenna 40-2 may be located within region 110 of device 10. Antenna 40-2 may at least partially overlap upper slot 60U and/or conductive support plate 58. Antenna 40-2 may convey radio-frequency signals in the 5 GHz WLAN band without covering the UWB band(s) or the cellular ultra-high band. When configured in this way, the antennas in the left corner of upper region 20 may collectively cover the cellular low band, the cellular low-midband, the L1 GPS band, the cellular midband, the cellular high band, the cellular ultra-high band, the 5 GHz WLAN band and the UWB band(s).

Antenna 40-4 (in a right corner of upper region 110 in FIG. 6) may have an antenna resonating element arm (e.g., an inverted-F antenna resonating element arm) formed from segment 68 partially shown in FIG. 7. The frequency response of antenna 40-4 may be determined by the length of segment 68, one or more harmonic modes of segment 68 and/or upper slot 60U, and/or antenna tuning components coupled between segment 68 and conductive support plate 58. Segment 68 and antenna 40-4 may convey radio-frequency signals in the cellular midband, the cellular high band, the 2.4 GHz WLAN and WPAN band, and the cellular ultra-high band. If desired, antenna 40-4 may include an extended portion of upper slot 60U similar to extended portion 114 of antenna 40-3 (e.g., an extended portion of upper slot 60U from the opposing end of upper slot 60U at gap 18-3 of FIG. 5, where the extended portion is interposed between conductive support plate 58 and segment 70 of FIG. 5). The extended portion of upper slot 60U may contribute a response peak in the cellular ultra-high band for antenna 40-4, as an example.

The example of FIG. 7 is merely illustrative. If desired, upper slot 60U, extended portion 114, segment 66, segment 68, and conductive support plate 58 may have other shapes (e.g., shapes having any desired number of straight and/or curved portions and any desired number of straight and/or curved edges).

As described in connection with FIG. 7, antennas 40-2 and 40-3 may be in close proximity to each other (e.g., both formed in the left corner of upper portion 20 of device 10) and may cover frequency bands that are relatively close together (e.g., antenna 40-2 may cover the 5 GHz WLAN band whereas antenna 40-3 may cover the UWB band(s) and the cellular ultra-high band, which are close in frequency to the 5 GHz WLAN band). As such, if care is not taken, these two antennas may undesirably interfere with each other during operation. If desired, device 10 may include an antenna isolation structure that minimizes interference between antennas 40-2 and 40-3.

Figure 8:
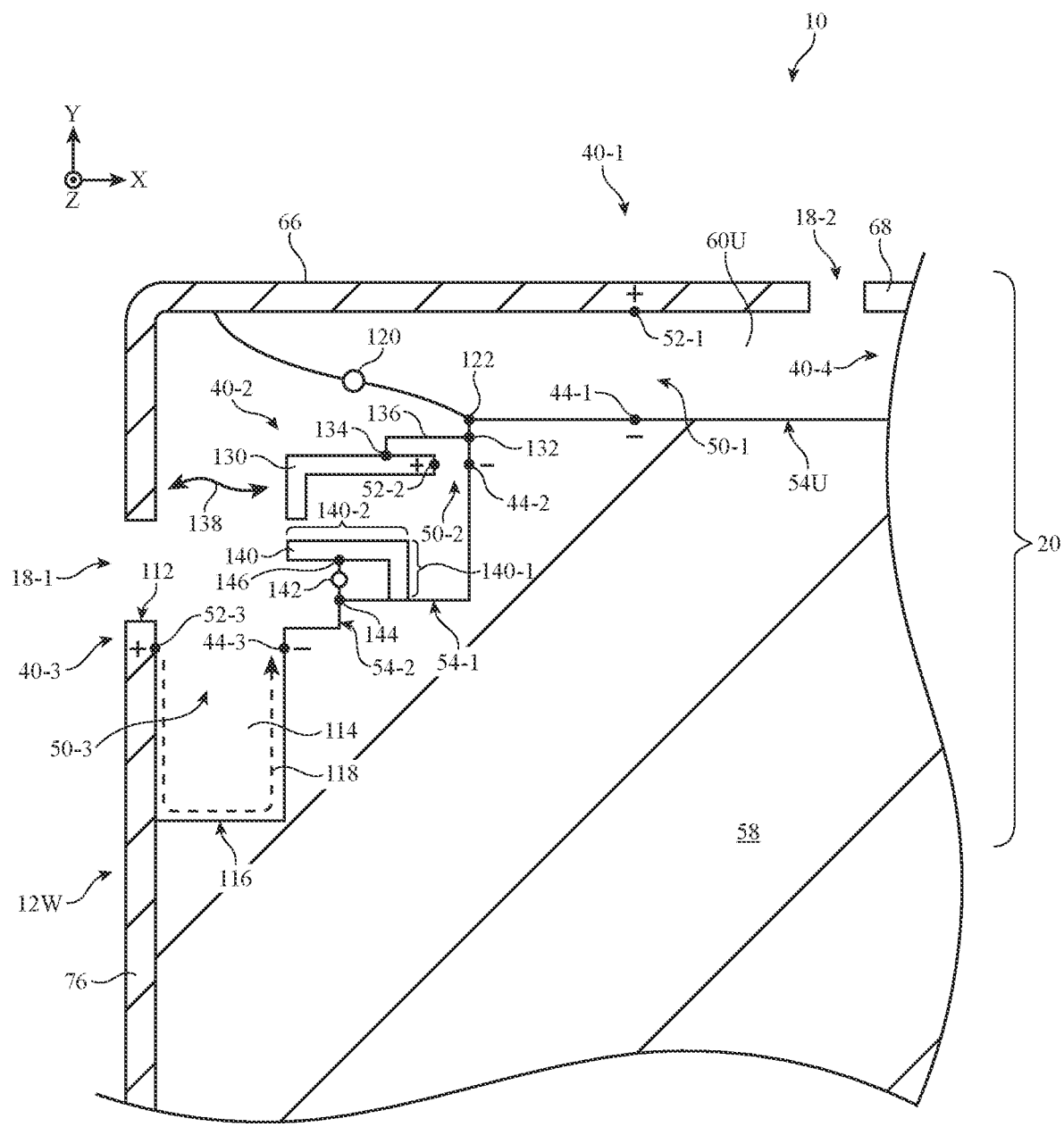
FIG. 8 is a top interior view showing how an illustrative isolation structure may be coupled between multiple antennas at a corner of an electronic device in accordance with some embodiments.

FIG. 8 is a top interior view showing how an antenna isolation structure may be provided for minimizing interference between antennas 40-2 and 40-3. As shown in FIG. 8, antenna 40-2 may have an antenna resonating element 130 such as an antenna resonating element arm. Antenna resonating element 130 may, for example, be an L-shaped antenna resonating element arm that overlaps upper slot 60U (e.g., antenna resonating element 130 may be disposed within upper slot 60U). If desired, antenna resonating element arm 130 may be formed on a substrate (e.g., formed from conductive metal traces on a printed circuit substrate) that at least partially overlaps upper slot 60U and/or conductive support plate 58. This is merely illustrative and, in general, antenna resonating element 130 may have other shapes and may be formed using other types of antenna resonating element structures.

Antenna resonating element 130 may have a first segment or portion that extends along a first longitudinal axis (e.g., parallel to the X-axis of FIG. 8) and a second segment or portion that extends along a second longitudinal axis (e.g., parallel to the Y-axis of FIG. 8). The second segment may, for example, be shorter than the first segment. The first segment may be separated from a portion of the antenna ground such as conductive support plate 58 by a gap (e.g. a gap that is part of upper slot 60U). Antenna 40-2 may be fed using antenna feed 50-2 coupled across the gap. For example, antenna feed 50-2 may have a positive antenna feed terminal 52-2 coupled to antenna resonating element 130 and may have a ground antenna feed terminal 44-2 coupled to conductive support plate 58. Antenna 40-2 may include a return path 136 that couples the first segment (e.g., at location 134) to conductive support plate 58 (e.g., at location 132).

If desired, return path 136 may be implemented in combination with other nearby components such as component 120 coupled between location 134 on segment 66 and location 122 on conductive support plate 58. Component 120 may be used to form a return path for antenna 40-1, may provide tunable components for tuning the frequency response of antenna 40-1, may form a portion of the antenna feed for antenna 40-1, may form a portion of the feed for an NFC antenna (e.g., NFC transceiver circuitry (not shown) may be coupled to a point such as location 124 on segment 66; segment 66, segment 68, and a portion of conductive support plate 58 may form a loop antenna resonating element for the NFC transceiver circuitry), etc. As an example, component 120 may include a connection to conductive support plate 58 and return path 136 may be coupled to conductive support plate 58 through the connection in component 120.

If desired, the first segment of antenna resonating element 130 may extend across upper slot 60U along the first longitudinal axis (e.g., parallel to the X-axis of FIG. 8) such that the second segment of antenna resonating element 130 is in close proximity to segment 66 (e.g., to the portion of segment 66 that extends along the second longitudinal axis parallel to the Y-axis of FIG. 8). This may enable a near-field electromagnetic coupling 138 between segment 66 and antenna resonating element 130 across a portion of upper slot 60U. As such, antenna 40-2 may use antenna resonating element 130 and optionally segment 66 (e.g., through indirect coupling 138, through which element 130 couples to and excites segment 66) to convey radio-frequency signals in the 5 GHz WLAN band.

As shown in FIG. 8, an antenna isolation structure such as parasitic element 140 may separate antenna 40-2 from antenna 40-3 to reduce interference between the two antennas. Parasitic element 140 may sometimes be referred to herein as (antenna) isolation element 140, (antenna) isolation structure 140, or antenna parasitic element 140. In the example of FIG. 8, parasitic element 140 is an L-shaped conductive strip that overlaps upper slot 60U (e.g., is disposed within upper slot 60U). As an example, parasitic element 140 may be formed on a substrate (e.g., formed from conductive metal traces on the same flexible printed circuit substrate on which antenna resonating element 130 is formed, formed from conductive metal traces on another printed circuit substrate overlapping upper slot 60U and/or conductive support plate 58, etc.). If desired, parasitic element 140 may be formed in any other suitable manner.

Parasitic element 140 may have a first elongated segment or portion 140-1 that extends along a first longitudinal axis (e.g., parallel to the Y-axis of FIG. 8) and a second elongated segment or portion 140-2 that extends along a second longitudinal axis (e.g., parallel to the X-axis of FIG. 8). Segment 140-1 may, for example, be shorter than segment 140-2. Parasitic element 140 may have a proximal end at segment 140-1 coupled to conductive support plate 58. Parasitic element 140 may have a distal end at segment 140-2 extending towards segment 66, gap 18-1, and segment 76. In particular, segment 140-2 may be disposed or extend between antenna resonating element 130 for antenna 40-2 and the slot resonating element of antenna 40-3 (e.g., extended portion 114 of slot 60U, a portion of conductive support plate 58 defining the slot resonating element).

The proximal end of parasitic element 140 may be coupled to support plate 58 along edge 54-1. A tuning element 142 for parasitic element 140 may have a first terminal coupled to location 146 at segment 140-2 and a second terminal coupled to location 144 at conductive support plate 58 (e.g., to a location along edge 54-1). Tuning element 142 may include capacitive, resistive, and/or inductive components that help to tune the isolation characteristics of parasitic element 140 (e.g., to enable antenna 40-2 to exhibit peak efficiency in its desired frequency band(s) of operation such as the 5 GHz WLAN band and reduce efficiency outside its desired frequency band(s) of operation, and to enable antenna 40-3 to exhibit peak efficiency in its desired frequency band(s) of operation such as the UWB band(s) and the cellular ultra-high band and reduce efficiency outside its desired frequency band(s) of operation).

As examples, tuning element 142 may provide a shunt capacitance for parasitic element 140 (e.g., may provide one or more capacitors between parasitic element 140 and conductive support plate 58), may provide a shunt inductance for parasitic element 140 (e.g., may provide one or more inductors between parasitic element 140 and conductive support plate 58). In some illustrative arrangements, tuning element 142 may provide a shunt capacitance of 0.3 pF, 0.4 pF, 0.5 pF, 0.7 pF, or any other suitable capacitance across locations 146 and 144. In other illustrative arrangements, tuning element 142 may provide a shunt inductance of 1 nH or any other suitable inductance across locations 146 and 144. These examples are merely illustrative. If desired, tuning element 142 may provide fixed capacitive, resistive, and/or inductive components across locations 146 and 144. If desired, tuning element 142 may include switching circuitry and may provide adjustable capacitive, resistive, and/or inductive components across locations 146 and 144.

It should be noted that, in the example of FIG. 8, parasitic element 140 is unfed (e.g., parasitic element 140 is not directly fed by a corresponding antenna feed). Parasitic element 140 may therefore be sometimes be referred to herein as an unfed parasitic element or an unfed isolation element. If desired, antenna elements in antennas 40-2 and 40-3 may be indirectly (e.g., near-field electromagnetically) coupled to parasitic element 140, and parasitic element 140 may contribute to (e.g., improve) the frequency response of antennas 40-2 and 40-3 (e.g., at one or more of their corresponding frequency bands of operation). The example of FIG. 8 is merely illustrative.

Figure 9:
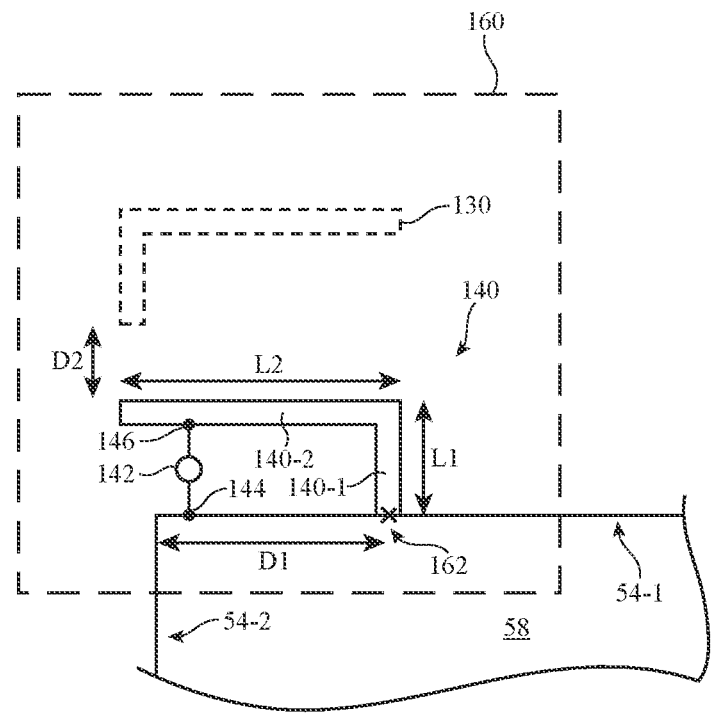
FIG. 9 is a diagram of an illustrative isolation structure having segments with different lengths in accordance with some embodiments.

FIG. 9 is a diagram showing an illustrative configuration for parasitic element 140. In particular, a substrate 160 (e.g., a printed circuit substrate such as a flexible printed circuit or a rigid printed circuit board, a dielectric antenna support structure, etc.) may be include conductive metal traces forming parasitic element 140. If desired, other elements in device 10 such as antenna resonating element 130, tuning component 142, component 120 (FIG. 8), and/or other elements for antenna 40-1, 40-2, and 40-3 may also be formed on substrate 160 (e.g., signal paths in transmission lines formed from signal metal traces on substrate 160, antenna ground structures and/or connections formed from ground metal traces on substrate 160 and connected to support plate 58, etc.). Substrate 160 may therefore overlap portions of support plate 58 and/or upper slot 60U (FIG. 8). If desired, in this illustrative configuration, parasitic element 140 may be coupled (e.g., electrically connected) to conductive support plate 58 through one or more ground metal traces and/or corresponding vias in substrate 160 (e.g., to corresponding locations 144 and 162 along edge 54-1 of support plate 58).

The isolation characteristics of parasitic element 140 may be determined based on the length L1 of segment 140-1, the length L2 of segment 140-2, the distance D1 between location 162 (e.g., at edge 54-1 of conductive support plate 58, to which a proximal end of parasitic element 140 is coupled) and the end of edge 54-1 at edge 54-2, the distance D2 between parasitic element 140 and antenna resonating element 130, the properties of tuning component 142, etc.

In an illustrative arrangement, it may be desirable to provide parasitic element 140 with a non-zero distance D1 such as 1.6 mm, 1.5 mm, 1.0 mm, a distance less than or greater than 1.6 mm, or any other suitable non-zero distance D1. As an example, non-zero distances D1 may help to mitigate negative impacts that parasitic element 140 may have on the frequency response of antenna 40-2 (e.g., at the frequency bands of operation for antenna 40-2).

In an illustrative arrangement, it may be desirable to implement parasitic element 140 with a relatively long length L1 (and consequently a relatively small distance D2). As examples, the length L1 may be 2.8 mm, 3.0 mm, 2.5 mm, a length greater than 2.8 mm or a length less than 2.8 mm and greater than 1.6 mm, or any other suitable length L1. As an example, doing so may provide improved isolation of antenna 40-2 from antenna 40-3 (e.g., antenna 40-2 may exhibit decreased antenna efficiency at the frequency bands of operation for antenna 40-3).

Figure 10:
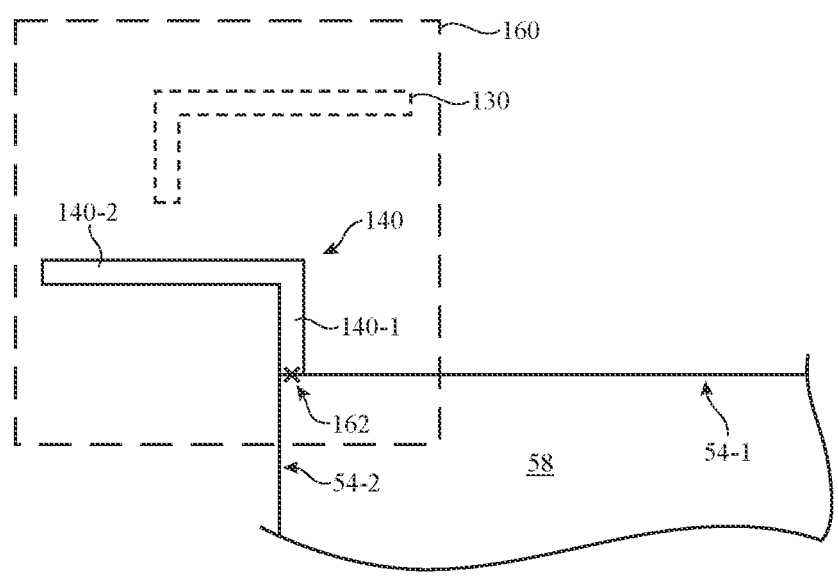
FIG. 10 is a diagram of an illustrative isolation structure coupled to a corner of a ground structure at a proximal end in accordance with some embodiments.

These examples are merely illustrative and, in general, parasitic element 140 may have other shapes and dimensions, may disposed relative to other neighboring elements in any suitable manner, and may be formed using other types of antenna isolation structures. As shown in FIG. 10. parasitic element 140 may be coupled to support plate 58 at a corner defined by edges 54-1 and 54-2. As an example, doing so may provide improved isolation of antenna 40-2 from antenna 40-3 (e.g., parasitic element 140 may be more completely interposed between antennas 40-2 and 40-3 because segment 140-2 may extend further into upper slot 60U). While not shown in the example of FIG. 10, tuning component 142 may be coupled between parasitic element 140 and support plate 58 if desired.

Figure 11:
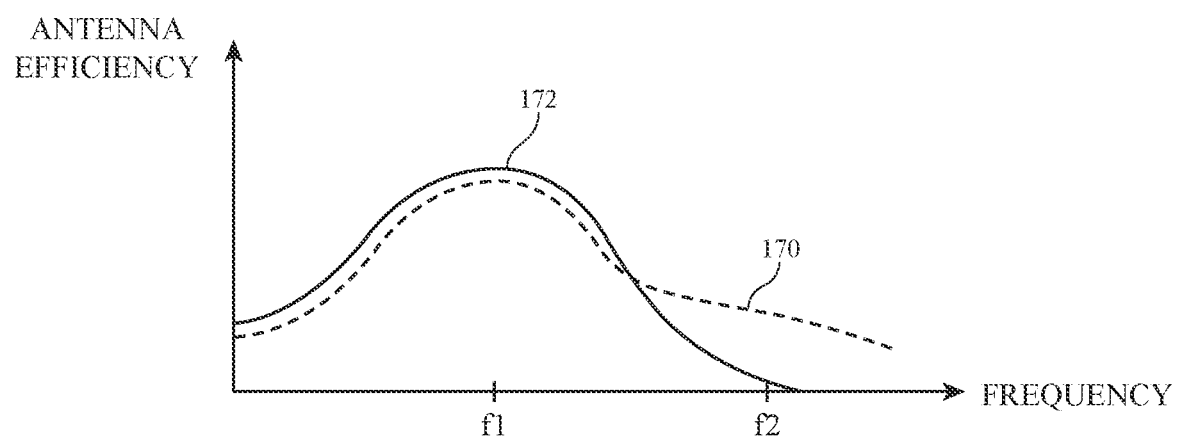
FIG. 11 is an illustrative plot of antenna performance (antenna efficiency) as a function of frequency for illustrative antenna configurations of the types shown in FIGS. 6-10 in accordance with some embodiments.

FIG. 11 is an illustrative plot of antenna performance (antenna efficiency) as a function of frequency for the wireless communications circuitry of device 10 (as described in connection with FIGS. 6-10). As an example, line 170 in FIG. 11 may depict an illustrative antenna efficiency for antenna 40-2 across first and second frequency bands respectively centered at frequencies f1 and f2. In particular, the first frequency band may be a desired frequency band of operation for antenna 40-2, while the second frequency band may be undesired frequency band of operation for antenna 40-2 (e.g., may be the desired frequency band of operation for antenna 40-3 in close proximity to antenna 40-2). In some arrangements, antenna 40-3 may undesirably couple to antenna 40-2, thereby inducing increase antenna efficiency at the second frequency band (as shown by line 170 around frequency f2).

By providing an antenna system with isolation structures such as parasitic element 140 (e.g., as described in FIGS. 8-10) between antennas 40-2 and 40-3, antenna 40-2 may be better isolated from antenna 40-3. As an example, line 172 in FIG. 11 may depict an illustrative antenna efficiency for antenna 40-2 in an antenna system having parasitic element 140. In particular, configured in this manner, antenna 40-2 may still exhibit satisfactory performance at the first frequency band and may exhibit reduced antenna efficiency at the second frequency band. If desired, antenna 40-3 may exhibit analogous isolation effects due to parasitic element 140 (e.g., exhibit satisfactory performance at the second frequency band, exhibit reduced antenna efficiency at the second frequency band, etc.). The plot in FIG. 11 is merely illustrative. In some arrangements, antennas 40-2 (and 40-3) may exhibit different frequency responses. Curves 170 and 172 may have other shapes.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   peripheral conductive housing structures;
   a dielectric-filled gap that divides the peripheral conductive housing structures into first and second segments, wherein the first segment has an end at the dielectric-filled gap;
   a conductive support plate coupled to the first segment and separated from the second segment by a slot, wherein the slot has an extended portion that extends away from the second segment and beyond the end of the first segment, the extended portion of the slot having a first edge defined by the first segment and an opposing second edge defined by the conductive support plate;
   a slot antenna formed from the extended portion of the slot;
   an additional antenna having an antenna resonating element arm overlapping the slot; and
   a parasitic element that is coupled to the conductive support plate, wherein the parasitic element overlaps the slot and is disposed between the extended portion of the slot and the antenna resonating element arm.

2. The electronic device defined in claim 1, wherein the slot antenna comprises a first antenna feed coupled to the first segment and the conductive support plate across the extended portion of the slot.

3. The electronic device defined in claim 2, wherein the additional antenna is an inverted-F antenna having a return path that couples the antenna resonating element arm to the conductive support plate.

4. The electronic device defined in claim 3, wherein the antenna resonating element arm is separated from the conductive support plate by an additional portion of the slot and the inverted-F antenna has a second antenna feed coupled to the antenna resonating element arm and the conductive support plate across the additional portion of the slot.

5. The electronic device defined in claim 4, wherein the antenna resonating element arm is separated from the second segment by another additional portion of the slot and the antenna resonating element arm is configured to indirectly couple to the second segment through the another additional portion of the gap via near-field electromagnetic coupling.

6. The electronic device defined in claim 4, further comprising:

another additional antenna having an antenna resonating element formed from the second segment and having a third antenna feed coupled to the antenna resonating element and conductive support plate across the slot.

7. The electronic device defined in claim 1, wherein the parasitic element has a proximal end coupled to the conductive support plate at an edge of the conductive support plate.

8. The electronic device defined in claim 7, wherein the parasitic element has a distal end that extends towards the first and second segments and the dielectric-filled gap.

9. The electronic device defined in claim 1, further comprising:
a tuning element for the parasitic element, the tuning element having a first terminal coupled to the parasitic element and having a second terminal coupled to the conductive support plate.

10. The electronic device defined in claim 9, wherein the parasitic element comprises a first segment that is coupled to the conductive support plate and a second segment that is separated from the conductive support plate by an additional portion of the slot, the second segment of the parasitic element being coupled to the conductive support plate via the first segment of the parasitic element.

11. The electronic device defined in claim 10, wherein the tuning element is coupled to the parasitic element and the conductive support plate across the additional portion of the slot.

12. The electronic device defined in claim 1, further comprising:
a printed circuit substrate, wherein the parasitic element comprises first conductive traces on the printed circuit substrate and the additional antenna comprises second conductive traces on the printed circuit substrate.

13. The electronic device defined in claim 12, wherein the printed circuit substrate comprises a flexible printed circuit that overlaps the slot and the conductive support plate.

14. An electronic device comprising:
a housing having peripheral conductive structures;
first and second dielectric-filled gaps that divide the peripheral conductive structures, wherein a first segment of the peripheral conductive structures extends from the first dielectric-filled gap to the second dielectric-filled gap, and the first dielectric-filled gap separates the first segment from a second segment of the peripheral conductive structures;
an antenna ground separated from the first segment by a slot, the slot including a first portion between the second segment and the antenna ground;
a slot antenna formed from the first portion of the slot;
an additional antenna having an antenna resonating element arm that overlaps a second portion of the slot extending between the first segment and the antenna ground; and
a conductive isolation structure that overlaps a third portion of the slot between the first and second portions of the slot.

15. The electronic device defined in claim 14, wherein the conductive isolation structure has first and second elongated portions, the first elongated portion couples the second elongated portion to the antenna ground, and the first elongated portion has a first length that is less than a second length of the second elongated portion.

16. The electronic device defined in claim 14, further comprising:
a tuning element coupled between the conductive isolation structure and the antenna ground, the tuning element comprising a capacitive element, an inductive element, or a resistive element.

17. An electronic device comprising:
peripheral conductive housing structures;
a dielectric-filled gap that divides the peripheral conductive housing structures into first and second segments, wherein the first segment has an end at the dielectric-filled gap;
an antenna ground coupled to the first segment and separated from the second segment by a slot, wherein the slot has an extended portion that extends away from second segment and beyond the end of the first segment, and the extended portion of the slot has a first edge defined by the first segment and an opposing second edge defined by the antenna ground;
first and second antenna feed terminals for a first antenna feed respectively coupled to the first segment and the antenna ground across the extended portion of the slot;
an antenna resonating element between the second segment and the antenna ground;
third and fourth antenna feed terminals for a second antenna feed respectively coupled to the antenna resonating element and the antenna ground; and
a conductive isolation element between the first antenna feed and the second antenna feed, wherein the conductive isolation element is configured to isolate the antenna resonating element from the extended portion of the slot.

18. The electronic device defined in claim 17, wherein the antenna resonating element has a first end that extends towards the first segment and near-field couples with the second segment and a second end that extends towards the antenna ground.

19. The electronic device defined in claim 17, wherein the extended portion of the slot is configured to radiate in a first cellular telephone frequency band and in an ultra-wideband (UWB) frequency band in response to first antenna currents conveyed by the first antenna feed, and the antenna resonating element is configured to radiate in a 5 GHz wireless local area network (WLAN) frequency band in response to second antenna current conveyed by the second antenna feed.

20. The electronic device defined in claim 19, further comprising:
a third antenna feed coupled to the second segment and the antenna ground across the slot, wherein the second segment is configured to radiate in a second cellular telephone frequency band that is lower than the first cellular telephone frequency band in response to third antenna currents conveyed by the third antenna feed.

* * * * *